Figure 1:
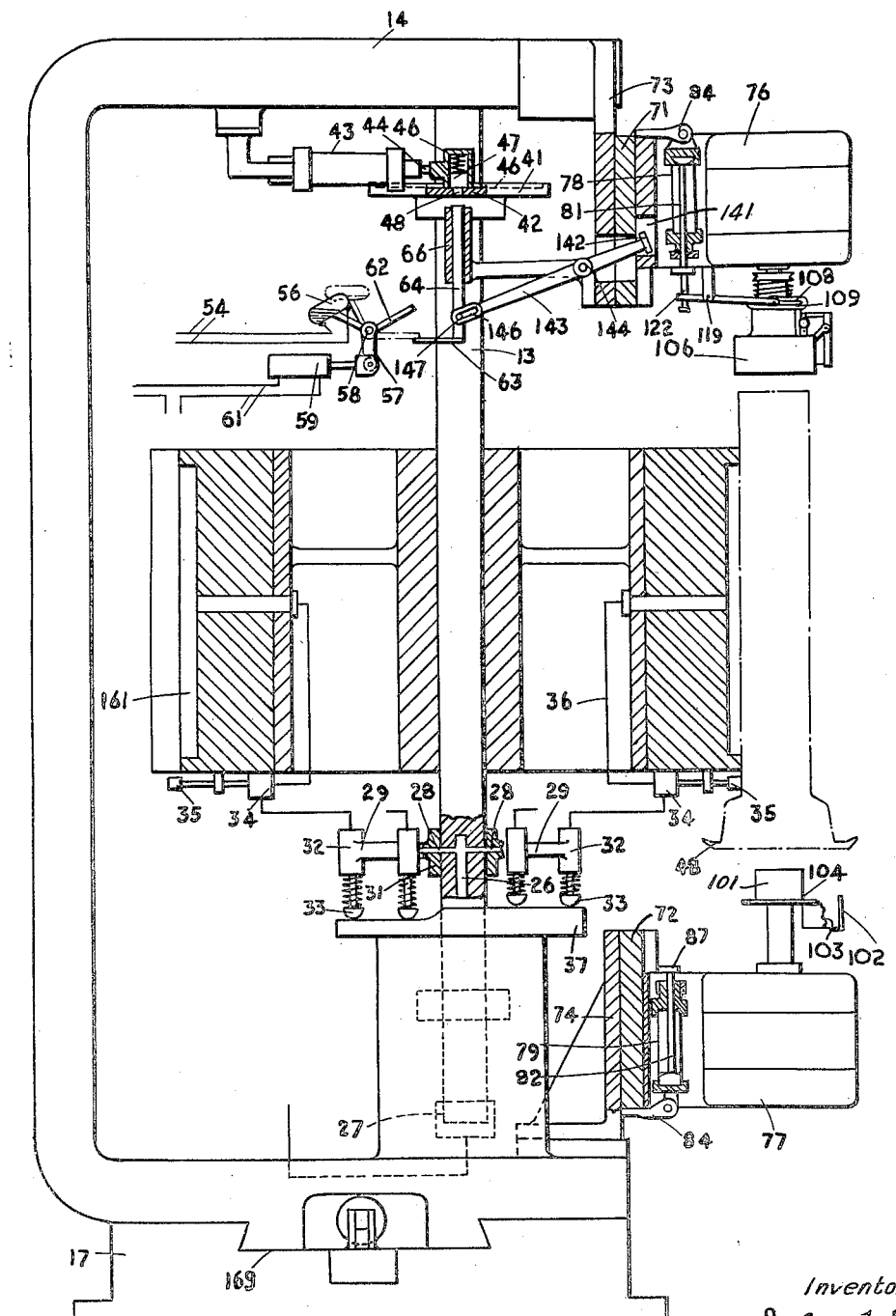

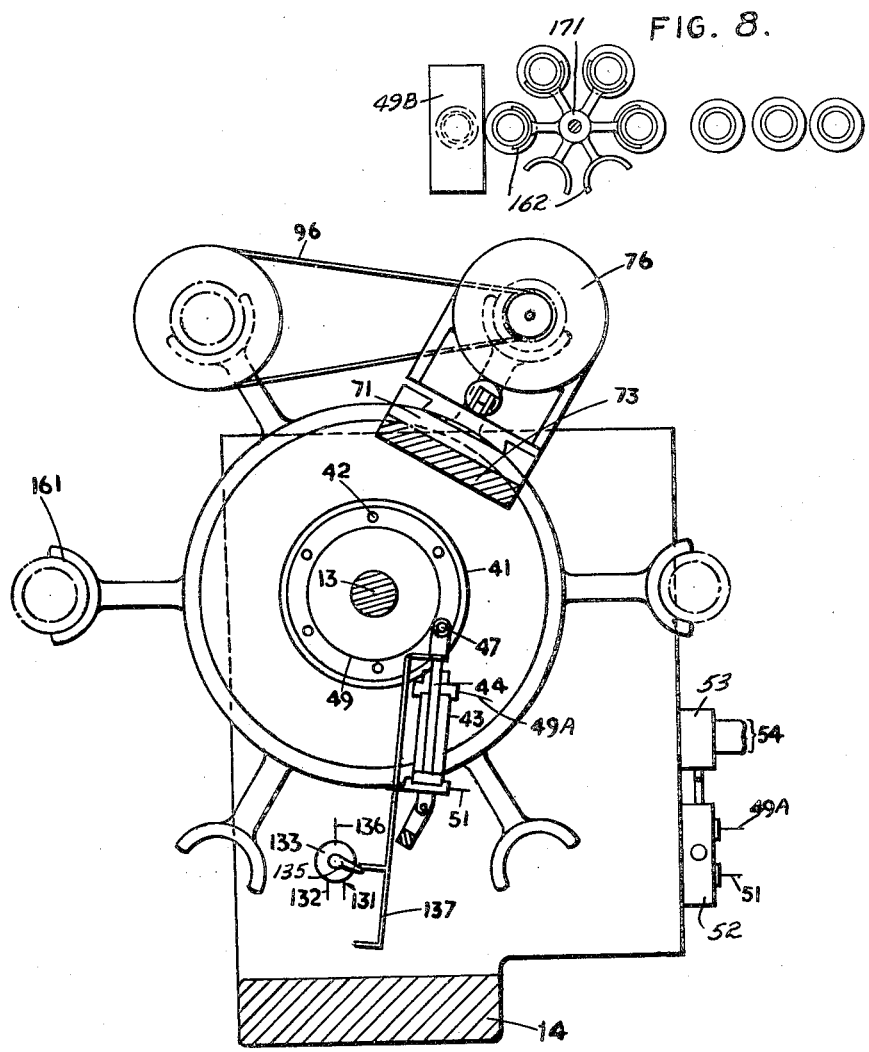
FIG. 8.
FIG. 3.
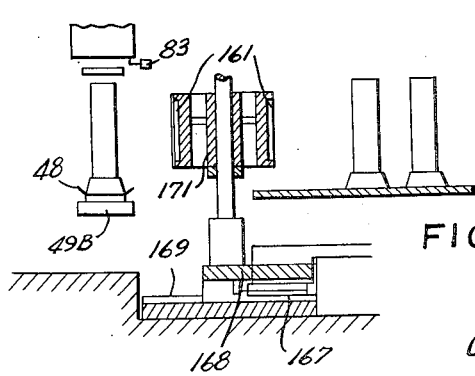
FIG. 6.

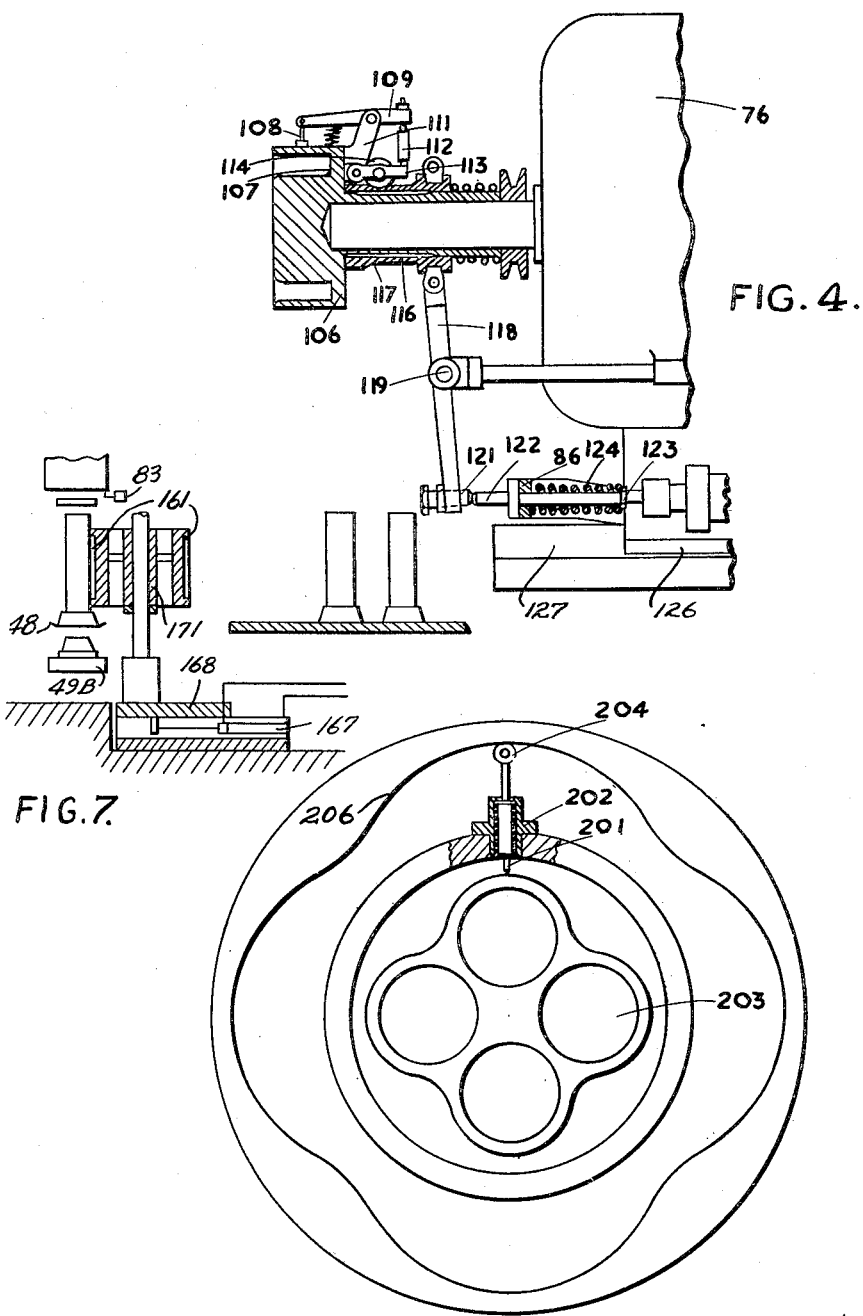

Patented Feb. 13, 1951

2,541,570

UNITED STATES PATENT OFFICE 2,541,570

METHOD AND APPARATUS FOR FINISHING EXTRUDED PIPES OF CLAYWARE

John F. Booth, Hazlehead, near Sheffield, England

Application June 10, 1947, Serial No. 753,692
In Great Britain June 18, 1946

20 Claims. (Cl. 25—30)

This invention relates to finishing machines in which extruded pipes and conduits of clayware are trimmed, cut to length and finally shaped, together if necessary with marking, grooving, and roughening, before being dried and burnt. Ordinarily, a pipe is placed manually on one or more revolving spindles equipped with trimming and other tools, for operation on one end of the pipe at a time and, after removal from the machine, receive purely manual treatment, such as internal scoring of sockets. The labour involved in pushing a pipe on to a spindle and pulling it off, and repeating the operations on a second spindle is extremely arduous, as well as costly. The pipes are also very liable to be damaged by the handling.

According to the present invention, the extruded pipes are fed in succession on to a movable support which is moved to carry each pipe in turn to an operating station or succession of stations at which finishing tools are fed to one or both ends of the pipe to perform finishing operations upon completion of which the finishing tools are withdrawn and the support is moved to carry the finished pipe to a delivery station. Preferably the support is one of a number movable into position in turn to enable feeding, operating, and delivery to be performed simultaneously and sequentially on a number of pipes.

The trimming and several other of the finishing steps may generally be performed by rotary tools, and, where both ends of the pipe are operated on simultaneously, the tools should rotate in opposite directions to counteract the tendency of each to rotate the pipe itself. The tools operate at high speed with a light pressure, so as not to distort the newly-extruded pipe. The rotating tools are advanced towards the end of the pipes, and are conveniently mounted on motors directly driving the tools and movable bodily towards the pipe. If desired, however, a tool at one or more operating stations may be driven by a motor disposed at another operating station or elsewhere.

The avoidance of handling of the pipes throughout trimming and finishing, and especially the bringing of the tools to the work at the operating station or stations, not only cheapens and expedites the whole operation but substantially reduces the wastage due to mishandling of the plastic material.

The machine may be manually fed or it may receive the pipes automatically, e. g., from a transfer mechanism as described in U. S. patent application Serial No. 753,691. The movement of the pipes from one station to another is timed to correspond with the feeding rate. Thus in a machine taking the output of an extruding press, the machine advances one station as each pipe is delivered. The advance may, as described in U. S. patent application Serial No. 753,690 which has become Patent 2,480,442, be initiated by the production of a clay fringe extruded in the formation of the pipe. The time cycle of the machine is adjusted to be no greater than the time required to extrude each pipe.

The movable support is preferably in the form of a rotatable member provided with a series of radial saddles of arcuate shape, each arranged to receive a pipe, the saddles extending over a substantial part of the length of the pipe, and when the pipes are fed to the saddles manually, they rest in the saddles under their own weight, the saddles being of sufficient depth to cradle a pipe firmly. The rotatable member may be mounted on a horizontal shaft and the feeding, finishing and delivery stations arranged symmetrically with respect to the shaft over the upper arc of the circle of rotation of the saddles. In such a case, the feeding of the pipes to the saddles is conveniently carried out by a transfer mechanism that carries each pipe from a vertical position as extruded in the press to a horizontal position for feeding to a saddle of the rotatable member, as described in specification No. 753,691, mentioned above.

When extruding pipes in a vertical press, however, it is convenient for the rotatable member mentioned above to be arranged for rotation about a vertical axis, and in such a case, the saddles of the rotatable member may be arranged to serve the additional function of transfer members, the rotatable member being arranged to be moved bodily towards and away from the press to effect the transferring operation. Suction may be applied to the saddles for effecting the transfer and for holding the pipes in the saddles during the finishing operations.

Figure 2:
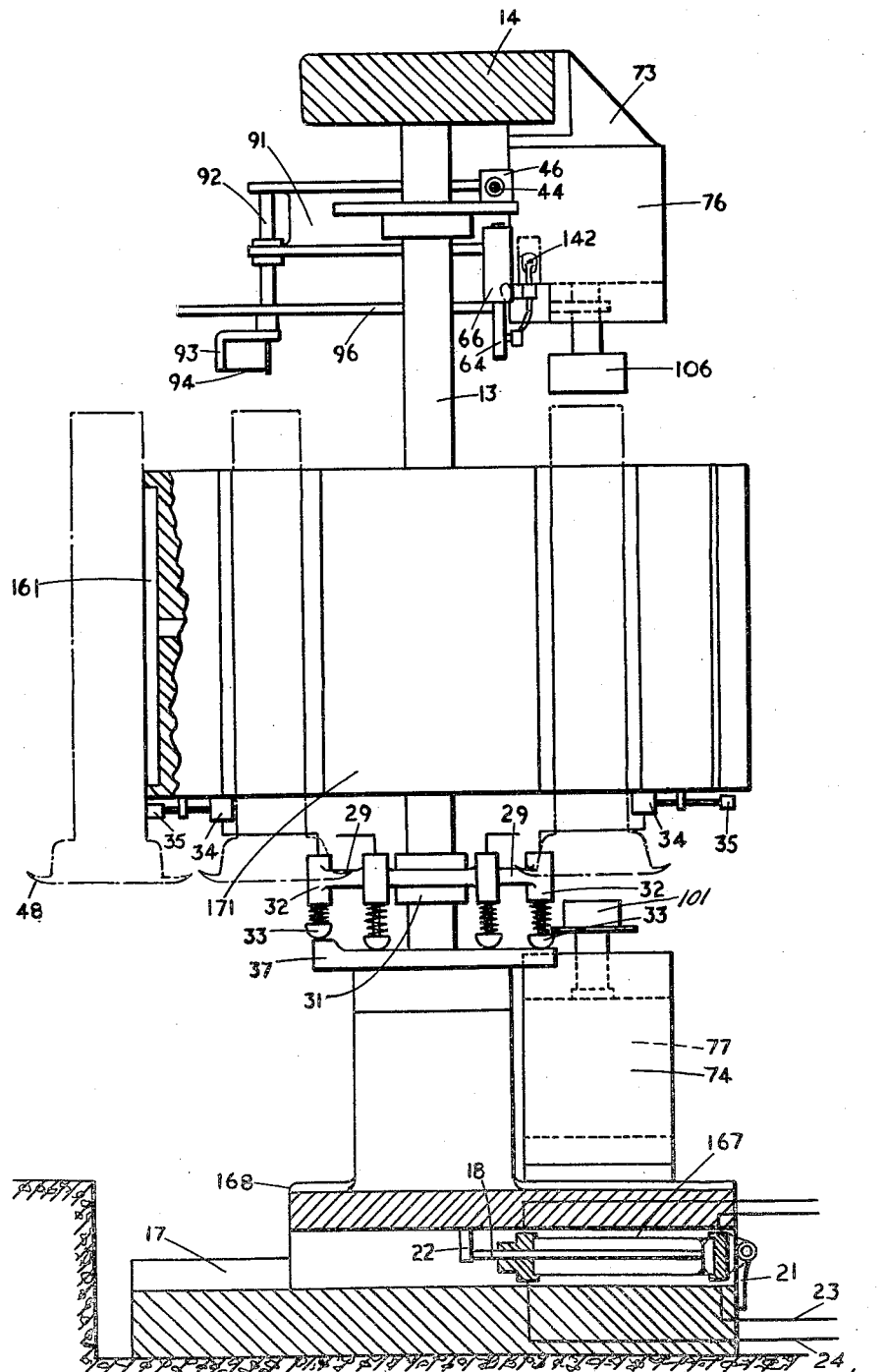

One form of apparatus according to the invention will now be described in greater detail with reference to the accompanying diagrammatic drawings, in which Figure 1 is an elevation, partly in section, of the apparatus, Figure 2 is an end view of the apparatus shown in Figure 1, Figure 3 is a plan view of part of the apparatus shown in Figure 1, Figure 4 is an elevation of a detail of the apparatus shown in Figure 1, drawn to a larger scale, Figure 5 shows a detail of the apparatus modified to suit a multiple bore pipe, and Figures 6, 7 and 8 are diagrams illustrating the transfer of the pipes from a press to the finishing machine.

Referring to Figures 1 to 4, a rotatable member 171 formed with six radial saddles 161 is secured to a vertical shaft 13 rotatably mounted in suitable bearings in a main frame 14. The frame 14 is slidably mounted in a slideway 169 formed in a base plate 17 and is arranged to be reciprocated in the slideway by a hydraulic piston 18 slidably mounted in a cylinder 167 attached by means of a bracket 21 to the base plate 17, the piston 18 being attached to an arm 22 depending from the base 168 of the main frame 14. Liquid is supplied to the cylinder 167 through conduits 23 and 24. The lower portion of the shaft 13 is formed with a central bore 26 connected through a suitable gland 27 to a vacuum pump (not shown), the bore 26 communicating with suction passages 28 in the arms 29 of a spider 31 secured to the shaft 13, the passages 28 connecting the bore 26 to valve housings 32 in each of which is arranged a spring loaded valve 33. The housings 32 are each connected to a valve 34 mounted on the side of a saddle 161 and connected to a suction inlet on the saddle 161 by a conduit 36 the stem of each valve 34 being attached to a spring loaded marking stamp 35. The saddles 161 are of arcuate shape and provided with a permeable surface similar to that of the transfer saddle described in specification No. 753,691, mentioned above. The period of operation of the valves 33 is controlled by a stationary annular cam 37.

The rotatable member 171 is arranged for intermittent rotation by an indexing disc 41 secured to the shaft 13 adjacent an over-hanging part of the frame 14. The disc 41 is formed with a series of six holes 42 arranged circumferentially of the disc and corresponding to the saddles 161. Pivotally attached to the frame 14 adjacent the disc 41 is a hydraulic cylinder 43 in which is slidably mounted a piston 44 the end of which terminates in a boss 46 carrying a spring loaded plunger 47 formed with a pin 48 arranged to pass into the holes 42. The outside diameter of the boss 46 is arranged to run in a recess 49 in the face of the disc 41 for guiding the plunger 47 when the pin 48 is withdrawn. The stroke of the piston 44 is equal to the circumerential distance between the holes 42 so that each operative stroke of the piston 44 causes the disc 41 and thus the rotatable member 171 to rotate through a sixth of a revolution.

Liquid is supplied to the cylinder 43 through conduits 49A and 51 leading to a spring-loaded hydraulic valve 52 arranged to be operated by a solenoid 53 wired in a high tension circuit 54. Arranged in the circuit 54 is a mercury switch 56 carried by a lever 57 pivoted at 58, the pivotal movement of the lever 57 being controlled by a solenoid 59 arranged in a low tension circuit 61 controlled by a switch 83 (see Figure 6) arranged to be operated by the exudation of a fringe of clay during the formation of the pipe in a press, as described in specification No. 753,690, mentioned above. The lever 57 is provided with a disconnecting arm 62 arranged in the path of movement of an arm 63 extending from a lock shaft 64 slidably mounted in a bearing member 66, the axis of the shaft 64 intersecting the pitch circle of the holes 42 in the disc 41 and so disposed that it lies co-axial with the pin 48 when the piston 44 is at the end of its operative stroke.

Slidably mounted in slideways 71 and 72 secured respectively to supporting brackets 73 and 74 extending from the upper and lower portions of the frame 14, are a pair of motors 76 and 77, respectively. The motors are arranged co-axial with their common axis lying coincident with the axis of a pipe when in position in a saddle 161 at the second finishing station in order of rotation of the rotatable member 171. The motors 76 and 77 are provided with hydraulic cylinders 78 and 79, respectively, in which are slidably mounted pistons 81 and 82, respectively, the cylinders being attached by brackets 84 to the slideways 71 and 72, while the pistons 81 and 82 co-operate, respectively, with brackets 86 and 87, attached respectively to the slides of the motors 76 and 77, to cause sliding movement of the motors towards and away from each other to carry trimming and finishing tools to the pipes as described below. Extending from the slide of the motor 76 is a bracket 91 carrying a bearing member 92 in which is freely mounted the shaft of a finishing tool consisting of a frame 93 across which is stretched a wire 94. The trimming tool is driven by the motor 76 through a belt 96. The axis of the bearing member 92 is arranged coincident with the axis of a pipe when in position in a saddle 161 at the first finishing station.

Secured to the shaft of the motor 77 is a tool head 101 on which is mounted a trimming tool 102, a grooving tool 103 and a radiusing tool 104. Secured to the shaft of the motor 76 is a further tool head 106 on which is mounted a fixed radiusing tool 107 and a movable grooving tool 108. As shown in detail in Figure 4, the grooving tool 108 is pivotally mounted on one end of a lever 109 and is arranged to pass through a hole in the outer rim of the tool head 106. The lever 109 is pivotally mounted on a bracket 111 secured to the tool head 106 and is connected by a link 112 to the free end of a lever 113 pivoted on the tool head and carrying a roller 114. A grooved bobbin 116 freely mounted on the shank of the tool head is arranged in engagement with the roller 114 and is formed with a cam portion 117 arranged, upon axial movement of the bobbin 116 to effect pivotal movement of the lever 113 and thus the lever 109 so as to move the tool 108 into or out of engagement, as the case may be, with the pipe for the time being at the second finishing station. Axial movement of the bobbin 116 is effected by a lever 118 pivoted at 119 on an extension from the framework of the motor 76 and pivotally connected at one end of a yoke in engagement with the groove of the bobbin 116, while the other end carries an adjustable stop 121 arranged to be engaged by an extension 122 of the piston 81. The extension 122 is formed with a shoulder 123 between which and the bracket 86 is arranged a spring 124. Upon movement of the piston 81 in the operative direction, therefore, it compresses the spring 124 thus causing the motor to slide by spring pressure on the bracket 86 until a stop member 126 on the motor slide meets a stop 127 on the slideway 71 whereupon the motor stops and the piston 81 continues its movement to rock the lever 118 to operate the tool 108.

The cylinders 78 and 79 are fed with liquid through common conduits 131, 132, from a common rotary valve 133 to which liquid is fed by a main supply line 136. A lever 135 on the valve shaft controls the valve and is arranged to be operated by a controlling arm 137 secured to the piston 44.

The operation of the machine arranged to take the output of a press similar to that described in specification No. 753,690, mentioned above, will now be described.

Upon operation of the switch 83 of the press by the fringe 48 of a pipe being formed (see Figures 6 and 7), the solenoid 59 is operated to tip the mercury switch 56 and close the high tension circuit 54, and at the same time move the arm 62 into a position adjacent the arm 63 extending from the lock shaft 64 which at this time is in retracted position clear of the disc 41. Closing of the circuit 54 energises the solenoid 53 which is thus caused to operate the valve 52 to supply liquid to the cylinder 43 through the conduit 49A thus moving the piston 44 and causing it to rotate the disc 41 through a sixth of a revolution to the position shown in Figure 3, such motion advancing the rotatable member 171 one step in the finishing cycle. As the piston 44 effects this movement, the controlling arm 137 operates the valve 133 to supply liquid to the motor cylinders 78 and 79 thus causing the motors 76 and 77 (which normally run continuously) to slide up to operative position. During the sliding motion of the motors, a slot 141 in the slide of the motor 76 is arranged, after a delay sufficient to allow the tool head 106 partially to embrace the end of the pipe at that station while the rotatable member is locked in position by the pin 48 in engagement with the disc 41, to engage a head 142 on a lever 143 pivoted at 144 on the bracket 73, the other end of the lever being formed with a slot 146 for engaging a pin 147 in the lock shaft 64. During further movement of the motor 76, therefore, the lever 143 is rocked and causes the shaft 64 to slide into the hole 42 of the disc 41 occupied by the pin 48, thus pushing out the pin 48 and releasing the piston 44 and itself locking the disc. The movement of the shaft 64 in the locking direction causes the arm 63 to engage the arm 62 on the lever 57 and cause it to pivot the mercury switch 56 into the "off" position, thus breaking the circuit 54.

With the motors 76 and 77 in their operative positions and the rotatable member 171 locked by the shaft 64, finishing operations are performed at the first and second finishing stations simultaneously. Thus, the wire 94 moves into engagement with one end of the pipe at the first finishing station so as to face it up to length, while at the second station, operations are performed on both ends of the pipe simultaneously. At the socket end of the pipe, the fringe 48 is trimmed off by the tool 102, grooves are cut in the internal surface of the socket by the tool 103 and the base of the socket is radiused by the tool 104. At the other end of the pipe, the fixed radiusing tool 107 forms a radius on the inner edge of the pipe while the movable grooving tool 108 is operated to form a groove in the external surface of the pipe.

As mentioned above, the movement of the motors into operative position causes the arm 63 to operate the switch 56 and thus break the circuit 54, and when this happens, the solenoid 53 returns to its initial position thus allowing the valve 52 to reverse and cause the piston to move in the opposite direction so as to allow the pin 48 to snap into the next hole 42 of the disc in readiness for the next advance. The return movement of the piston causes the arm 137 to reverse the valve 133 thus causing the motors to return to their inoperative positions, and in so doing, cause the lever 143 to pivot and withdraw the lock shaft 66 so as to free the disc 41 for movement by the piston 44 during the next step in the cycle.

The operations just described take place during the extrusion of a pipe by the press, and are completed as the table 49B of the press reaches the limit of its extrusion movement. At this stage, the table operates a valve controlling the supply of liquid to the cylinder 167 and causes the piston 18 to move the finishing machine towards the press until the adjacent saddle 161 is in contact with the pipe just extruded, the pipe in the meantime having been lowered clear of the moulding chamber of the press by the table 49. As the saddle reaches the pipe, the stamp 35 makes an identification indentation on the pipe and at the same time operates the valve 34 to cause suction to be applied to the saddle so as to seize the pipe, the suction being maintained in the saddle until it reaches the delivery station by the cam 37. Further downward movement of the table 49 reverses the valve controlling the piston 18 and the machine is retracted. The table 49 is then returned for the next extruding operation, commencement of which actuates the piston 44 to commence the next step in the finishing cycle as described above.

When finishing multiple pipes, it will be understood that appropriately shaped saddles are used and that multiple heads are driven by the motors to effect finishing operations within the several bores and the trimming of the fringe from the circular base of the socket. External grooving on the non-circular body portion in such a case is effected with the aid of a cam-operated tool as indicated diagrammatically in Figure 5.

Thus, a tool 201 is slidably mounted in a tool head 202 for movement towards the pipe 203 against the action of a spring, the shank of the tool 201 being provided with a roller 204 arranged to bear against the face of a stationary internal cam 206 having a path appropriate to the shape of the pipe. As the tool head rotates, the tool moves in and out in accordance with the shape of the cam and thus follows the shape of the pipe.

I claim:

1. Method of finishing extruded pipes of conduits of clayware, comprising feeding the pipes in succession to a transfer station, moving each pipe in succession from the transfer station over an arcuate path to carry it to a succession of finishing stations, performing finishing operations on at least one end of each pipe at each finishing station, and moving each pipe in succession further along said path to carry it from the last finishing station to a delivery station.

2. Method of finishing extruded pipes or conduits of clayware, comprising feeding the pipes in succession to a transfer station, applying suction to the surface of each pipe as it arrives at the transfer station so as to hold it in a definite position, moving each pipe in succession while so held from the transfer station over an arcuate path to carry it to a succession of finishing stations, performing finishing operations on at least one end of each pipe at each finishing station, and moving each pipe in succession further along said path to carry it from the last finishing station to a delivery station.

3. Method of finishing extruded pipes or conduits of clayware, comprising feeding the pipes in succession to a transfer station, intermittently moving the succession of pipes over an arcuate path simultaneously and sequentially to carry them to a succession of finishing stations and a delivery station, so that as one finished pipe is delivered another one is fed, and performing finishing operations on the pipes simultaneously and sequentially at the finishing stations.

4. Apparatus for finishing extruded pipes or conduits of clayware, comprising a rotatable support, means for feeding the pipes in succession to successive radial positions on said support, means for rotating said support to carry each pipe in turn to a finishing station or succession of stations, and at least one finishing tool adapted to be fed to at least one end of the pipe to perform a finishing operation thereon.

5. Apparatus according to claim 4, comprising a motor at each finishing station, the finishing tools being mounted directly on the motor shafts, and means for moving the motors so as to feed the tools towards the pipe.

6. Apparatus according to claim 4, comprising means responsive to the exudation of a fringe of clay during the formation of a pipe in a press, said means serving to initiate rotation of the rotatable support.

7. Apparatus for finishing extruded pipes or conduits of clayware, comprising a rotatable member formed with a series of radial supporting saddles, means for feeding the pipes in succession to successive saddles, means for rotating said rotatable member to carry each pipe in turn to a succession of finishing stations, and finishing tools adapted to be pressed simultaneously on to both ends of the pipes at at least one of the stations simultaneously.

8. Apparatus according to claim 7, wherein the rotatable member is arranged for rotation about a vertical axis, and means are provided for transferring the pipes to the saddles directly from a vertical press for forming the pipes.

9. Apparatus according to claim 8, comprising means for applying suction to the saddles for holding the pipes in vertical position during the finishing operations.

10. Apparatus according to claim 9, comprising a valve member rotatable with the rotatable member and provided with a series of valves, one for each saddle, conduits connecting said valves to said saddles, and a stationary annular cam for operating said valves so as to cause suction to be applied to said saddles from the feeding station to the delivery station.

11. Apparatus according to claim 7, comprising motors arranged with their axes coincident with the axes of the pipes when in position at the finishing stations, the finishing tools being mounted directly on the motor shafts, and means for moving the motors so as to feed said tools towards the pipes to perform finishing operations.

12. Apparatus for finishing extruded pipes or conduits of clayware, comprising a rotatable member formed with a series of radial supporting saddles, means for feeding the pipes in succession to successive saddles, an index plate for rotating said rotatable member, means for intermittently rotating said index plate so as to cause rotation of said rotatable member to carry the saddles successively from one finishing station to a succeeding finishing station, finishing tools adapted to be fed to at least one end of the pipes at each finishing station simultaneously, and means for locking said index plate during operation of said finishing tools.

13. Apparatus according to claim 12, comprising in the index plate a series of holes corresponding to the number of saddles, a fluid-operated piston provided with a spring loaded plunger, a valve for causing reciprocation of said piston so as to cause said plunger successively to engage the holes in said index plate and thus cause intermittent rotation of said rotatable member, and a lock shaft adapted to enter the hole for the time being engaged by said plunger at the completion of the stroke of said piston so as to push said plunger out of the hole thus freeing said piston from engagement with said index plate while at the same time locking said index plate during operation of said finishing tools.

14. Apparatus according to claim 13, comprising means responsive to the operative movement of a finishing tool for actuating said lock shaft.

15. Apparatus according to claim 12, comprising motors arranged with their axes coincident with the axes of the pipes when in position at the finishing stations, the finishing tools being mounted directly on the motor shafts, and means for moving the motors so as to feed said tools towards the pipes to perform finishing operations.

16. Apparatus for finishing extruded pipes or conduits of clayware, comprising a rotatable member formed with a series of radial supporting saddles, means for feeding the pipes in succession to successive saddles, means for rotating said rotatable member to carry each pipe in turn to one or a succession of finishing stations, finishing tools adapted to be fed to at least one end of the pipes at each station, and means responsive to the movement of the means for rotating said rotatable member for feeding the finishing tools.

17. Apparatus according to claim 16, comprising fluid-operated means for rotating said rotatable member and for feeding said finishing tools.

18. Apparatus for finishing extruded pipes or conduits of clayware, comprising a rotatable member formed with a series of radial supporting saddles, means for feeding the pipes in succession to successive saddles, an index plate for rotating said rotatable member, a fluid-operated piston for intermittently rotating said rotatable member to carry the saddles successively from one finishing station to succeeding finishing station, a finishing tool adapted to be fed to at least one end of the pipes at each finishing station, fluid-operated means responsive to the movement of said piston for feeding said tools, and means for locking said index plate during operation of said finishing tools.

19. Apparatus for finishing extruded pipes or conduits of clayware, comprising a rotatable member formed with a series of radial supporting saddles, means for feeding the pipes in succession to successive saddles, an index plate formed with a series of holes corresponding to the number of saddles, a fluid-operated piston provided with a spring-loaded plunger, a valve for causing reciprocation of said piston so as to cause said plunger successively to engage the holes in said index plate and thus cause intermittent rotation of said rotatable member to carry the saddles successively from one finishing station to a succeeding finishing station, motors arranged with their axes coincident with the axis of the pipes when in position at the finishing stations, finishing tools mounted directly on the motor shafts, fluid-operated pistons for moving the motors so as to feed said tools towards the pipes, a second valve for causing reciprocation of said motor pistons, said second valve being operable by means carried by said first-mentioned piston so as to bring about movement of said motors only after a pre-determined movement of said rotatable member, and a lock shaft adapted to enter the hole for the time being engaged by said plunger at the completion of the stroke of said piston so as to push said plunger out of the hole thus freeing said piston from engagement with said index plate while at the same time locking said index plate during the operation of said finishing tools.

20. Apparatus according to claim 19, comprising means responsive to the exudation of a fringe of clay during the formation of a pipe in a press, said means serving to initiate movement of said first-mentioned valve.

JOHN F. BOOTH.

REFERENCES CITED

The following references are of record in the file of this patent:

UNITED STATES PATENTS

| Number | Name | Date |
|---|---|---|
| 120,999 | Pierce | Nov. 14, 1871 |
| 815,238 | Von Oven | Mar. 13, 1906 |
| 817,045 | Clark, Jr. | Apr. 3, 1906 |
| 1,006,574 | Lorenz | Oct. 24, 1911 |
| 1,108,845 | Jensen | Aug. 25, 1914 |
| 1,340,929 | Batliner | May 25, 1920 |
| 1,461,222 | Meyers | July 10, 1923 |
| 1,938,230 | Ukropina | Dec. 5, 1933 |

FOREIGN PATENTS

| Number | Country | Date |
|---|---|---|
| 10,441 | Great Britain | May 3, 1909 |
| 12,559 | Great Britain | June 3, 1904 |